United States Patent Office 2,725,400
Patented Nov. 29, 1955

2,725,400

METHOD FOR PRODUCING KETONES

John W. Mecorney, Richmond Annex, and George W. Gaertner, Jr., Oakland, Calif., assignors to Shell Development Company, Emeryville, Calif., a corporation of Delaware No Drawing. Application October 22, 1951, Serial No. 252,578

8 Claims. (Cl. 260—593)

This invention is directed to a method for producing ketones by reacting an alcohol with a ketone in the presence of a catalyst, ketones so produced being referred to as "higher ketones" since they contain a greater number of carbon atoms than the starting (lower) ketones.

It is known that higher ketones can be produced by reacting aliphatic alcohols and ketones in the presence of a catalyst having dehydrogenating and dehydrating characteristics, the reaction proceeding at elevated temperatures and at atmospheric or higher pressures. A representative reaction is that which occurs between methyl ethyl ketone and secondary butyl alcohol, as indicated in the following equation:

$$CH_3 \cdot CO \cdot C_2H_5 + CH_3 \cdot CH(OH) \cdot CH_2 \cdot CH_3 \rightarrow$$
$$CH_3 \cdot CH_2 \cdot CH(CH_3) \cdot CH_2 \cdot CO \cdot C_2H_5 + H_2O$$

In the foregoing reaction the principal ketone product is the 5-methyl-3-heptanone shown, though some 3,4-dimethyl-2-hexanone is also formed. Small amounts of the corresponding $C_8$ alcohols 5-methyl-3-heptanol and 3,4-dimethyl-2-hexanol are also produced.

A wide variety of catalysts have heretofore been employed in carrying out reactions of the type described above. However, while many give a good initial conversion of the reactants to the various product compounds and a high yield of the desired ketones, the conversion falls off rapidly as the catalyst is used, with the result that the process must soon be discontinued to permit the introduction of fresh or reactivated catalyst. From the standpoint of practical operation, it is necessary that the conversion be maintained at a level above at least 40% during continuous operating periods well in excess of 100 hours, and it is a primary object of the present invention to provide a process which will make this result possible.

As employed herein, the term "conversion" refers to the total percentage of the alcohol and ketone reactants which is converted to various products. However, in determining the amount of such products formed, only those organic products having a carbon chain length greater than that of either of the reactants were taken into account, and the amounts of water and of any lower alcohols and ketones formed during the reaction (e. g. by dehydrogenation of the alcoholic reactant) are ignored. Accordingly, the conversion figures expressed herein are uniformly somewhat lower than the real conversion values. The term "yield" is employed to designate the percentage of said converted portion which goes to the indicated product compound. However, since the yield of the desired higher ketones is normally about the same (ca. 75–85%) no matter what the conversion, the conversion factor is that which will receive the greater emphasis herein.

It is our discovery that when a vaporous reaction mixture comprising an aliphatic ketone and an aliphatic alcohol is passed through an alumina-copper catalyst at a temperature between about 240° C. and 300° C. and at a pressure of at least about 175 p. s. i. g., conversions of at least 40% are obtained during continuous operating periods well in excess of 100 hours without regenerating the catalyst. On the other hand, by operating at temperatures below or above this range, or at pressures of ca. 100 p. s. i. g., for example, the conversion rapidly falls to a value below 30% in operating periods which are frequently as short as 20 to 30 hours.

The alcohol and ketone reactants employed can be selected from a wide variety of available compounds. Thus, the alcohol reactant can be any monohydric primary, secondary or tertiary alcohol of aliphatic character, representative alcohols being methyl alcohol, ethyl alcohol, n-propyl alcohol, isopropyl alcohol, n-butyl alcohol, sec.-butyl alcohol, tert.-butyl alcohol, n-amyl alcohol, isoamyl alcohol, tert.-amyl alcohol, n-hexyl alcohol, cyclohexanol, 4-methylcyclohexanol, n-octyl alcohol and n-decyl alcohol. A preferred class of alcohol reactants comprises the secondary alcohols containing from 3 to 7 carbon atoms, such as isopropyl alcohol, sec.-butyl alcohol, 2-hydroxypentane, 3-hydroxypentane, 2-hydroxyhexane, cyclohexanol and 2-hydroxyheptane. The ketone reactant should also be of aliphatic character, and representative reactants of this type include acetone, methyl ethyl ketone, methyl n-propyl ketone, diethyl ketone, hexanone-2, hexanone-3, methyl tert.-butyl ketone, di-n-propyl ketone, di-isopropyl ketone, di-isobutyl ketone and di-n-amyl ketone. A preferred class of ketone reactants is made up of those containing from 3 to 7 carbon atoms, several examples of which have here been given. In the most preferred practice of the invention, the alcohol and ketone reactants are so selected that the alcohol is one which, on being reduced, yields a ketone identical with the ketone reactant. This is the case, for example, when methyl ethyl ketone is reacted with secondary butyl alcohol, the latter being in part dehydrogenated to methyl ethyl ketone as the feed mixtures is passed through the catalyst.

The reactant portions which should be employed in carrying out the process of the present invention are not critical. In fact, when the (secondary) alcohol and ketone reactants combining to form the higher ketone have the same number of carbon atoms (as is the case with methyl ethyl ketone and secondary butyl alcohol, for example) it is possible to operate using only alcohol or a mixture of ketone and hydrogen as the feed. This is due to the fact that an equilibrium between the alcohol formed on hydrogenation of the ketone and the ketone formed on dehydrogenation of the alcohol is quickly established over the alumina-copper catalyst under the prevailing reaction conditions. In those cases where the higher ketone is formed by combining an alcohol with a ketone which does not have the same number of carbon atoms as the alcohol, it is only necessary to maintain a feed stream whose components have the desired carbon number ratio without regard to whether these components are alcohols or ketones. Thus, in a process nominally based on reacting isopropyl alcohol (a $C_3$ compound) with methyl ethyl ketone (a $C_4$ compound) to produce a $C_7$ ketone, there can be employed any desired admixture of the $C_3$ compounds isopropyl alcohol and acetone with the $C_4$ compounds methyl ethyl ketone and secondary butyl alcohol which will give a ratio of approximately 0.2 to 5 moles (and preferably 0.2–0.5 mole) of the $C_3$ compound for each mole of the $C_4$ compound. In plant operation, any unconverted alcohol and/or lower ketone components of the reactor effluent are recycled back to the reactor. Thus, in those cases where this recycle stream has a different carbon number ratio than the desired feed composition, it is only necessary to add a make-up component to the recycle stream which will reestablish the desired carbon number ratio. For example, in the case where $C_3$ and $C_4$ reactants are combined to produce a $C_7$ ketone, if the recycle stream is deficient in $C_3$ component the same can be supplied either as isopropyl alcohol or as acetone. Again, if the $C_4$ component is deficient, this can be remedied by adding secondary butyl alcohol or methyl ethyl ketone. It should be remembered however, that in all cases where the feed is unduly rich in ketones it may be necessary to add hydrogen to preserve the desired ketone-alcohol equilibrium over the catalyst.

The essence of the present invention resides in employing a pressure above 175 p. s. i. g., and preferably one from about 200 to 400 p. s. i. g., together with a catalyst temperature (maximum in the bed) of from about 240° C. to 300° C. Thus, as will be apparent from the data presented in the examples, a catalyst having an initial activity (as expressed in terms of percent conversion) in excess of 50% falls rapidly to but 33% after 10 hours of continuous operation when a system pressure of 50 p. s. i. g. is employed, and to approximately 29% after 100 hours of operation at 100 p. s. i. g. However, at 250 p. s. i. g. the activity is still well in excess of 40% after more than 200 hours of operation, and in many cases it is possible to maintain the activity at an average level in excess of 40% over an operating period of more than 300 hours without regenerating the catalyst. Similarly, a catalyst having an activity of 55% after 80 hours of continuous operation (and in excess of 40% after 200 hours of operation) at (maximum) bed temperatures of 255° and 285° C., respectively, has an activity of but 25% after 80 hours of continuous operation at either 315° C. or 225° C.

The catalyst employed in carrying out the present invention is made up in major proportion of alumina which has been rendered catalytically active by a suitable heating or other treatment, together with a quantity of from about 2 to 20% copper and optionally with from about 5 to 30% of a difficultly reducible metal oxide having dehydrogenating characteristics, such as zinc oxide, manganese oxide, iron oxide, calcium oxide or magnesium oxide. The catalyst employed can be prepared by any of the methods known in the art. However, a preferred catalyst is one which has been prepared by first impregnating activated alumina with a solution of a zinc salt, as zinc nitrate, for example, followed by a roasting treatment to convert the zinc salt to zinc oxide, and then impregnating the roasted catalyst with a solution of a copper salt, as copper nitrate, for example, followed by a second roasting treatment to convert the copper salt to copper oxide and by a step wherein the copper oxide is reduced to copper in a hydrogen atmosphere at suitably elevated temperatures. It is found that catalysts which have been prepared by this consecutive addition method have an activity which holds up somewhat better than that of catalysts wherein the zinc and copper salts are added simultaneously.

In carrying out the process of invention, a vaporous mixture of the alcohol and/or ketone reactants (optionally with hydrogen and/or a diluent gas) in the desired molar proportions is continuously passed through the catalyst bed at a temperature and pressure within the range shown above, and at the desired flow rate. This rate can be varied within relatively wide limits without serious effect upon the activity of the catalyst. Thus, good results can be obtained at an LHSV of from about 0.5 to 8, though a preferred LHSV is from about 1 to 4. The term "LHSV" here represents "liquid hourly space velocity" and designates the number of volumes of the feed mixture (measured in the liquid condition) which are passed through the catalyst per hour per nominal volume of catalyst. The effluent from the catalyst bed is then condensed and separated into its several components, or groups of components, by conventional distillation or other procedures. In commercial operation the light ends (comprising any alcohol and lower ketone reactants present) are recycled back to the reactor for combination with fresh quantities of the reactants in such proportions as may be necessary to make up a feed stream having the desired composition.

When higher ketones are formed from appropriate alcohol and/or ketone reactants over an alumina-copper catalyst under the conditions described above, the catalyst is found to display a high degree of activity for a relatively long period of time. When, however, the catalyst has suffered an appreciable decline in activity, it can be restored to the original, more active state by a conventional reactivation treatment wherein the used catalyst is first burned in the presence of an oxygen-containing gas stream and is then reduced at elevated temperatures in an atmosphere of hydrogen.

The process of the present invention is illustrated in various of its embodiments by the following examples:

Example I

In this operation there was employed a catalyst prepared by impregnating activated alumina (F-1 grade, a product of Aluminum Ore Company) with a concentrated aqueous solution of copper nitrate at about 80° C., the amount of copper nitrate solution employed being sufficient to provide approximately 10% by weight of copper, based on the weight of the dry catalyst. The excess water present was then evaporated and the product dried at 125° C. for 3 hours, following which the dry material was roasted at 425° C. in a stream of dry air for a further period of 4 hours. The roasted catalyst material was then introduced into a steel reactor tube where it was reduced in a stream of pure hydrogen gas at a temperature of 250° C. for 4 hours. A mixture of methyl ethyl ketone and secondary butyl alcohol in susbtantially equi-molar proportions was then vaporized and passed at an LHSV of 2 and a pressure of 250 p. s. i. g. through the catalyst in the reactor tube which was externally heated so as to control the (maximum) temperatures in the catalyst bed. In one series of runs the temperature in the reactor tube was so adjusted that the maximum temperature prevailing in the catalyst bed was 225° C., at which temperature the conversion was but 25% after only 23 hours of continuous operation. In the next series of runs the temperature in the reactor tube was raised so as to maintain a maximum temperature in the catalyst bed of 315° C. In this case the conversion fell to a value of 39% after only 60 hours of continuous operation. In the next series of runs the temperature in the reactor zone was adjusted so as to provide a maximum temperature in the catalyst bed of 255° C. In this case the conversion was still well above 40% at the end of 352 hours of continuous operation. The catalyst was then regenerated by being burned with air at about 275° C., followed by a reduction with hydrogen at 250° C. for 4 hours. When the process was continued using the reactivated catalyst it was found that the conversion was still 46% at the end of 223 hours of continuous operation. In the next series of runs the temperature in the reaction zone was adjusted so as to provide a maximum temperature in the catalyst bed of 285° C. Here the conversion was still 48% at the end of 160 hours of continuous operation, at which point the process was discontinued.

In all cases mentioned in the preceding paragraph, the yield of the desired C₈ ketone product (which consisted of about 95% 5-methyl-3-heptanone and about 5% 3,4-dimethyl-3-hexanone), was approximately the same, i. e., about 80%. These C₈ ketone products were recovered by condensing the effluent from the catalyst zone and collecting the fraction boiling at about 155 to 165° C. The start to 155° C. fraction, consisting mainly of methyl ethyl ketone, and water, with some secondary butyl alcohol, is dehydrated and recycled to the reaction zone for admixture with makeup secondary butyl alcohol.

Example II

In this operation there was employed the same catalyst and feed mixture as described above in Example I. Further, the (maximum) temperature in the catalyst bed was maintained at 285° C., though pressures of 50 and 250 p. s. i. g. were used. In the case of the runs conducted at 50 p. s. i. g., the conversion, which started at 53%, dropped to 29% after 10 hours of operation and to but 15% after 160 hours of operation. In contrast, when the operation was conducted at 250 p. s. i. g., the conversion (which initially was 66%) was still 48% after 160 hours of operation.

*Example III*

The series of runs described in the preceding example was then repeated, first with a catalyst containing 5% copper on alumina and then with a catalyst containing 15% copper on alumina, said catalysts having been prepared in the manner described in Example I. In the case of the catalyst containing 5% copper, the conversion at 50 p. s. i. g. was but 28% after 50 hours of operation. At 100 p. s. i. g. the conversion was 31% after 90 hours of operation. However, at 250 p. s. i. g., the conversion was still in excess of 40% after 110 hours of operation. With the catalyst containing 15% copper, the conversion after 42 hours of operation at 50 p. s. i. g. was but 10%. However, at 250 p. s. i. g., the conversion was still 43% after 192 hours of operation.

*Example IV*

In this operation the catalyst was prepared by first impregnating F-1 alumina with an aqueous solution of zinc nitrate in an amount sufficient to provide about 18% zinc oxide, based on the dry catalyst weight. On evaporating the excess water, the impregnated alumina was roasted at 425° C. to convert the zinc nitrate to zinc oxide. The catalyst was then impregnated with an aqueous solution of copper nitrate in an amount sufficient to provide about 7.4% copper, based on the dry catalyst weight. Here again, after the excess water present had been evaporated, the catalyst was roasted at 425° C. to convert the copper nitrate to cupric oxide. The catalyst was then charged through the reactor tube and reduced in an atmosphere of hydrogen at 280° C. (atmospheric pressure) for 3 hours to reduce the cupric oxide to copper. A gaseous feed mixture containing equi-molar proportions of methyl ethyl ketone and secondary alcohol was then passed through the catalyst at a pressure of 250 p. s. i. g. and an LHSV of 2, with the catalyst being maintained at a (maximum) temperature of 285° C. Under these conditions it was found that the conversion was approximatley 56% at the end of 200 hours of continuous operation.

A companion operation was continued under the same conditions as described in the preceding paragraph, but with a catalyst wherein the copper nitrate and zinc nitrate had been added simultaneously instead of sequentially, with an intervening roasting period. In this case the conversion was 42% at the end of 200 hours of continuous operation.

The various percentages expressed herein are on a weight basis, unless otherwise indicated.

We claim as our invention:

1. The method for producing higher ketones comprising bringing an aliphatic saturated secondary alcohol into reactive vapor phase engagement with an aliphatic saturated ketone in the presence of an alumina-copper catalyst consisting essentially of a major proportion of alumina, 2% to 20% of copper and not more than 30% of a metal oxide from the group consisting of zinc oxide, manganese oxide, iron oxide, calcium oxide and magnesium oxide at a temperature between 240 and 300° C. and a pressure between 175 and 400 p. s. i. g.

2. The method of claim 1 wherein the catalyst consists essentially of catalytically active alumina together with 2 to 20% copper and from 5 to 30% of said difficultly reducible metal oxide having dehydrogenating characteristics said copper being deposited on the surface of said difficultly reducible metal oxide.

3. In a method for producing higher ketones wherein a vaporous feed mixture of an aliphatic saturated secondary alcohol and an aliphatic saturated ketone is continuously passed through a reactor containing an alumina-copper catalyst consisting essentially of a major proportion of alumina, 2% to 20% of copper and not more than 30% of a metal oxide from the group consisting of zinc oxide, manganese oxide, iron oxide, calcium oxide and magnesium oxide, with the higher ketone then being separated from the effluent from the reactor, the step whereby the activity of the catalyst is maintained at a relatively high level over long periods of continuous operation by passing the vaporous feed mixture through the catalyst at a pressure from 200 to 400 p. s. i. g. while maintaining a maximum temperature of between 240 and 300° C. in the catalyst.

4. The method of claim 3 wherein the feed comprises a mixture of an aliphatic, secondary alcohol containing from 3 to 7 carbon atoms and an aliphatic ketone containing from 3 to 7 carbon atoms, and wherein the catalyst consists essentially of catalytically active alumina together with 2 to 20% copper and from 5 to 30% of said difficultly reducible metal oxide having dehydrogenating characteristics said copper being deposited on the surface of said difficultly reducible metal oxide.

5. In a method for producing $C_8$ ketones, the step wherein a vaporous feed mixture containing methyl ethyl ketone and secondary butyl alcohol is continuously passed through a catalyst consisting essentially of a major portion of activated alumina together with from about 2 to 20% copper and from about 5 to 30% of a difficultly reducible metal oxide having dehydrogenating characteristics from the group consisting of zinc oxide, manganese oxide, iron oxide, calcium oxide and magnesium oxide, at an LHSV between about 0.5 and 8 and at a pressure between 175 and 400 p. s. i. g., while maintaining a maximum temperature between 240 and 300° C. in the catalyst.

6. In a method for producing higher ketones, the step wherein a vaporous feed mixture of an aliphatic saturated secondary alcohol of 3 to 7 carbon atoms per molecule and a saturated aliphatic ketone of 3 to 7 carbon atoms per molecule is continuously passed, at a pressure of 175 to 400 p. s. i. g., through a catalyst consisting of a major portion of activated alumina together with from 2 to 20% copper and from 5 to 30% zinc oxide, said catalyst having been prepared by first impregnating the alumina with a solution of a zinc salt, followed by roasting to convert the zinc to zinc oxide, and then impregnating the catalyst with a solution of a copper salt, followed by roasting to convert the copper to copper oxide and then by a treatment whereby the copper oxide is reduced to copper, while maintaining a maximum temperature between 240° C. and 300° C. in the catalyst.

7. In a method for producing $C_8$ ketones, the step wherein a vaporous feed mixture containing methyl ethyl ketone and secondary butyl alcohol is continuously passed, at a LHSV between about 0.5 and 8 and at a pressure between 175 and 400 p. s. i. g., through a catalyst consisting essentially of activated alumina together with from 2% to 20% copper and from 5% to 30% zinc oxide, said catalyst having been prepared by first impregnating the alumina with a solution of a zinc salt, followed by roasting to convert the zinc to zinc oxide, and then impregnating the catalyst with a solution of a copper salt, followed by roasting to convert the copper to copper oxide and then by a treatment whereby the copper oxide is reduced to copper, while maintaining a maximum temperature between 240° C. and 300° C. in the catalyst.

8. In a method for producing higher ketones wherein a vaporous feed mixture of an aliphatic saturated secondary alcohol and an aliphatic saturated ketone is continuously passed at an LHSV between about 0.5 and 8 and at a pressure between 175 and 400 p. s. i. g., through a catalyst consisting essentially of activated alumina together with from 2% to 20% copper and from 5% to 30% zinc oxide, said catalyst having been prepared by first impregnating the alumina with a solution of a zinc salt, followed by roasting to convert the zinc to zinc oxide, and then impregnating the catalyst with a solution of a copper salt, followed by roasting to convert the copper to copper oxide and then by a treatment whereby the copper oxide is reduced to copper, while maintaining a maximum temperature between 240° C. and 300° C. in the catalyst.

References Cited in the file of this patent

UNITED STATES PATENTS

| | | |
|---|---|---|
| 2,064,254 | Fuchs et al. | Dec. 15, 1936 |
| 2,334,100 | Ipatieff et al. | Nov. 9, 1943 |
| 2,444,509 | Ipatieff et al. | July 6, 1948 |
| 2,498,709 | Roberts et al. | Feb. 28, 1950 |